US012352425B2

(12) United States Patent
Redd

(10) Patent No.: US 12,352,425 B2

(45) Date of Patent: Jul. 8, 2025

(54) CANDLE HOLDER ASSEMBLY

(71) Applicant: Michael Redd, Redford, MI (US)

(72) Inventor: Michael Redd, Redford, MI (US)

(*) Notice: Subject to any disclaimer, the term of this patent is extended or adjusted under 35 U.S.C. 154(b) by 232 days.

(21) Appl. No.: 18/131,528

(22) Filed: Apr. 6, 2023

(65) Prior Publication Data

US 2024/0337378 A1 Oct. 10, 2024

(51) Int. Cl.

*F21V 35/00* (2006.01)
*A47F 5/00* (2006.01)
*F21W 121/00* (2006.01)

(52) U.S. Cl.

CPC ............ *F21V 35/00* (2013.01); *A47F 5/0043* (2013.01); *F21W 2121/00* (2013.01)

(58) Field of Classification Search

CPC .... F21V 35/00; A47F 5/0043; F21W 2121/00
USPC ............................. 362/121, 249.06; 431/295
See application file for complete search history.

(56) References Cited

U.S. PATENT DOCUMENTS 679,984 A * 8/1901 O'Reilly
1,204,134 A * 11/1916 Connolly ................ F21V 35/00 431/295
1,940,841 A * 12/1933 Benziger ................. F21V 35/00 431/295
2,158,531 A * 5/1939 Brennan ................. F21V 35/00 431/295
2,310,019 A * 2/1943 Hamblet ................. C11C 5/006 431/126
4,583,955 A 4/1986 Toloczko
D600,505 S 9/2009 Godinger
10,189,634 B2 1/2019 Elgamal
11,592,173 B1 * 2/2023 Bernsen ................ F21V 21/096
2008/0241775 A1 * 10/2008 Piemontese ............. F21V 35/00 431/295
2011/0085327 A1 * 4/2011 Chen ......................... F21S 4/10 362/249.06
2018/0020682 A1 1/2018 Bullard

FOREIGN PATENT DOCUMENTS

CN 206927 1/2018
DE 202024104831 U1 * 12/2024

OTHER PUBLICATIONS

Search translation of DE-202024104831-U1, 12pages, 2024. (Year: 2024).*

* cited by examiner

*Primary Examiner* — Laura K Tso

(57) ABSTRACT

A candle holder assembly includes a support panel has a pair of arms each extending in opposing directions from central member such that the support panel defines a cross shape. Each of the arms is offset from a middle of the central member such that the support panel defines a crucifix to facilitate the ornamental celebration of religious holidays. A base is attached to the support panel thereby facilitating the base to support the support panel in a vertical orientation with respect to a support surface. A plurality of holders is provided and each of the holders is attachable to the support panel to support an object for the purposes of an ornamental display. A light strip is positionable to extend around the support panel to enhance the ornamental appeal of the support panel.

6 Claims, 6 Drawing Sheets

CANDLE HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to candle holder devices and more particularly pertains to a new candle holder device for ornamentally celebrating a religious holiday. The device includes a cruciform panel that is attached to a base and a plurality of holes each extending through the cruciform panel. The device includes a plurality of holders that are attachable to the cruciform panel for supporting candles for an ornamental display. The device includes a light strip that can be positioned around the cruciform panel to enhance the ornamental appeal of the cruciform panel.

(2) Description of Related Art Including Information Disclosed Under 37 CFR 1.97 and 1.98

The prior art relates to candle holder devices including a cupcake holder that is structured to have the ornamental appearance of a train. The prior art discloses a cupcake holder that includes a vase and a mount attached to the base that has a plurality of cups for holding cupcakes. The prior art discloses a cupcake holder that includes a member and a plurality of pegs extending away from the member to facilitate cupcakes to be impaled on the pegs.

BRIEF SUMMARY OF THE INVENTION

An embodiment of the disclosure meets the needs presented above by generally comprising a support panel has a pair of arms each extending in opposing directions from central member such that the support panel defines a cross shape. Each of the arms is offset from a middle of the central member such that the support panel defines a crucifix to facilitate the ornamental celebration of religious holidays. A base is attached to the support panel thereby facilitating the base to support the support panel in a vertical orientation with respect to a support surface. A plurality of holders is provided and each of the holders is attachable to the support panel to support an object for the purposes of an ornamental display. A light strip is positionable to extend around the support panel to enhance the ornamental appeal of the support panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
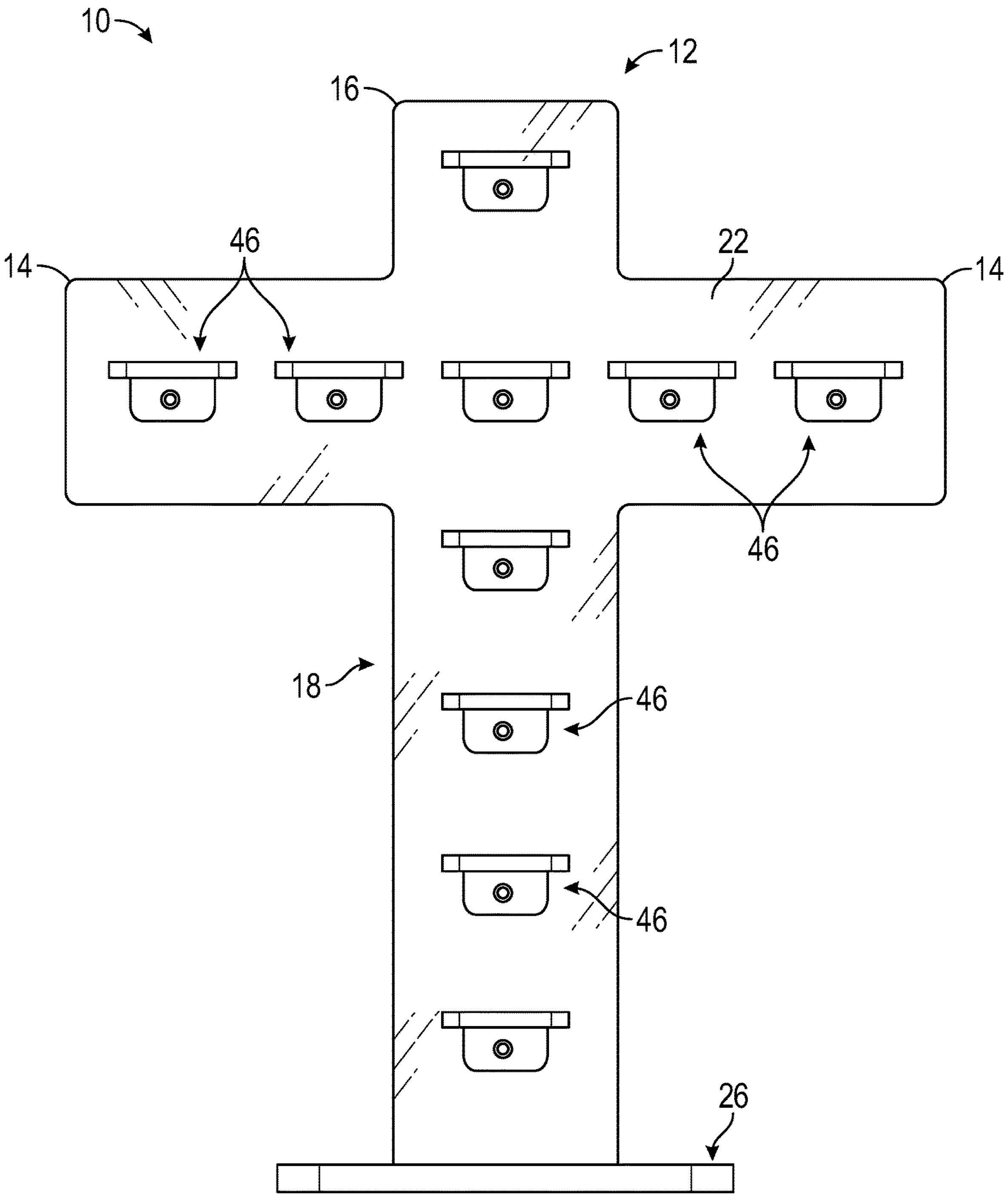
FIG. 1 is a front view of a candle holder assembly according to an embodiment of the disclosure.
Figure 2:
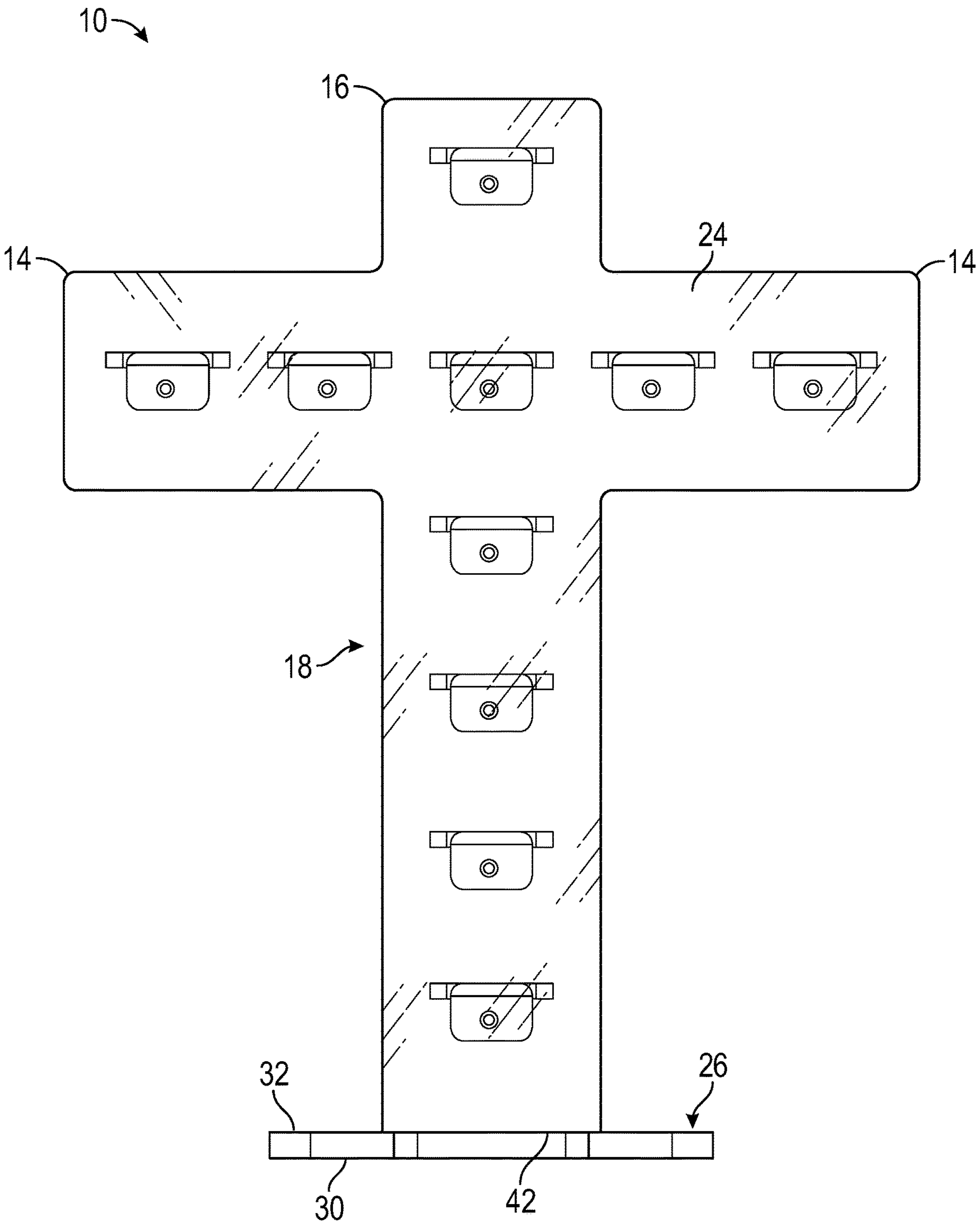
FIG. 2 is a back view of an embodiment of the disclosure.
Figure 3:
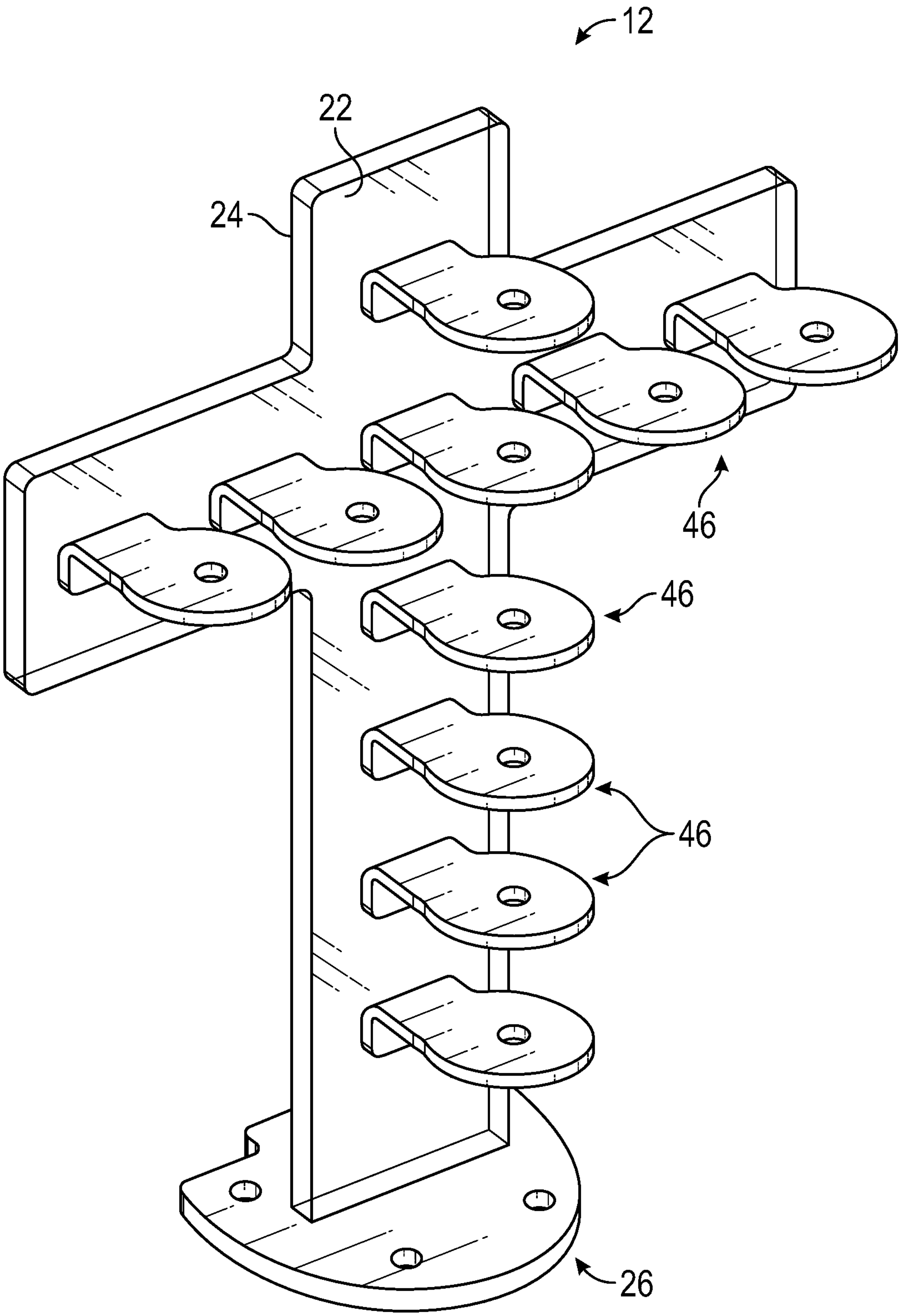
FIG. 3 is a front perspective view of an embodiment of the disclosure.
Figure 4:
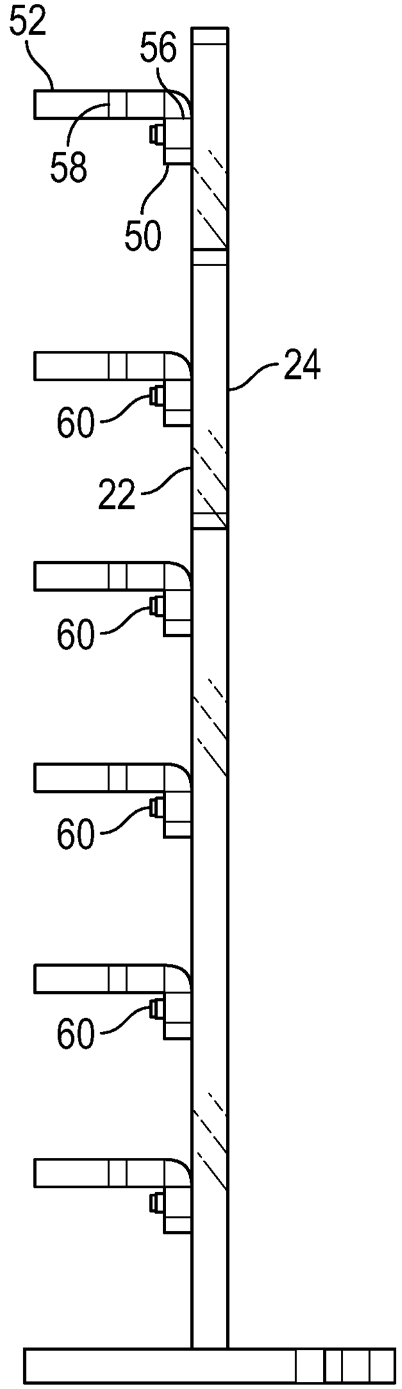
FIG. 4 is a left side view of an embodiment of the disclosure.
Figure 5:
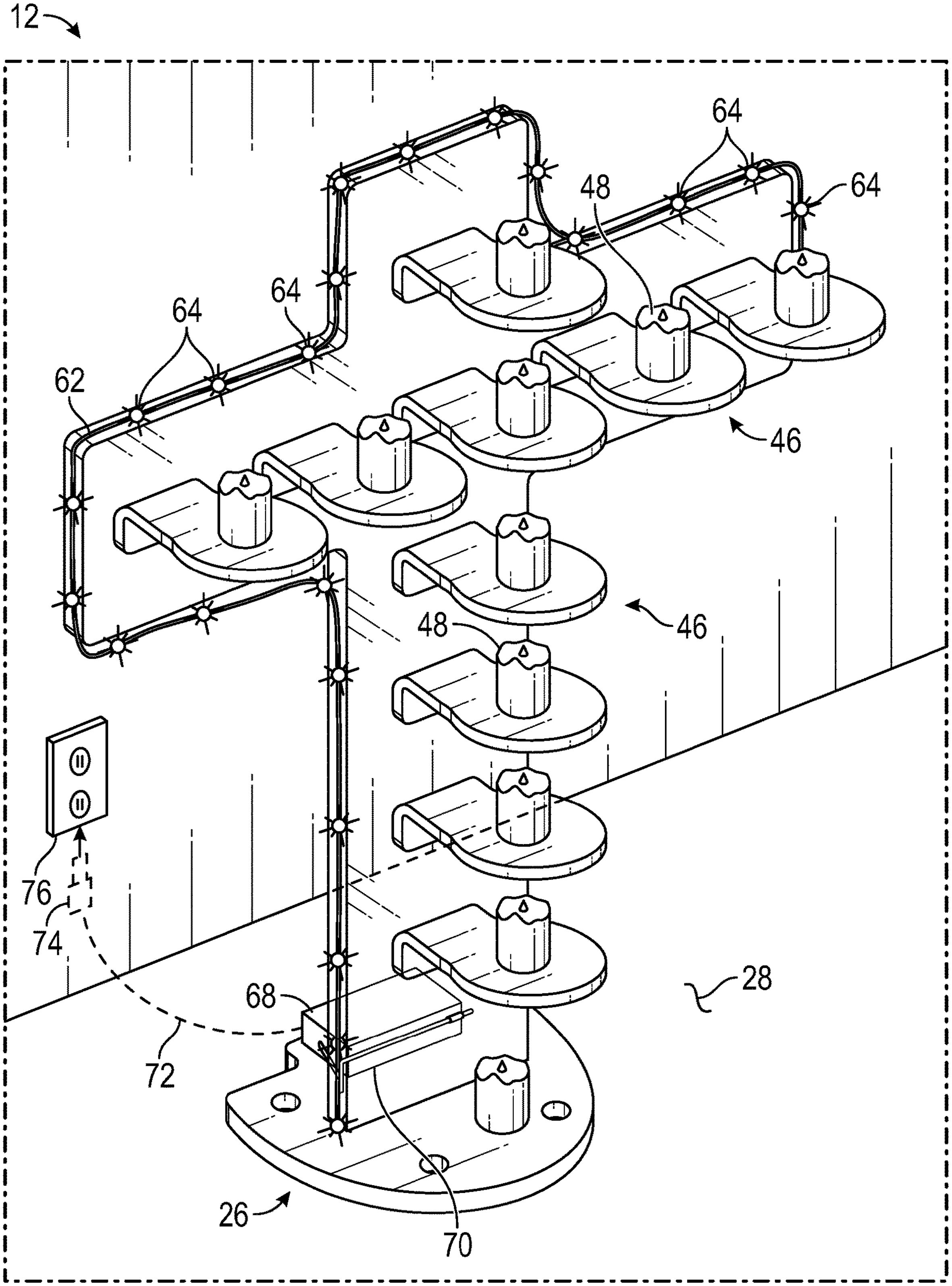
FIG. 5 is a perspective in-use view of an embodiment of the disclosure.
Figure 6:
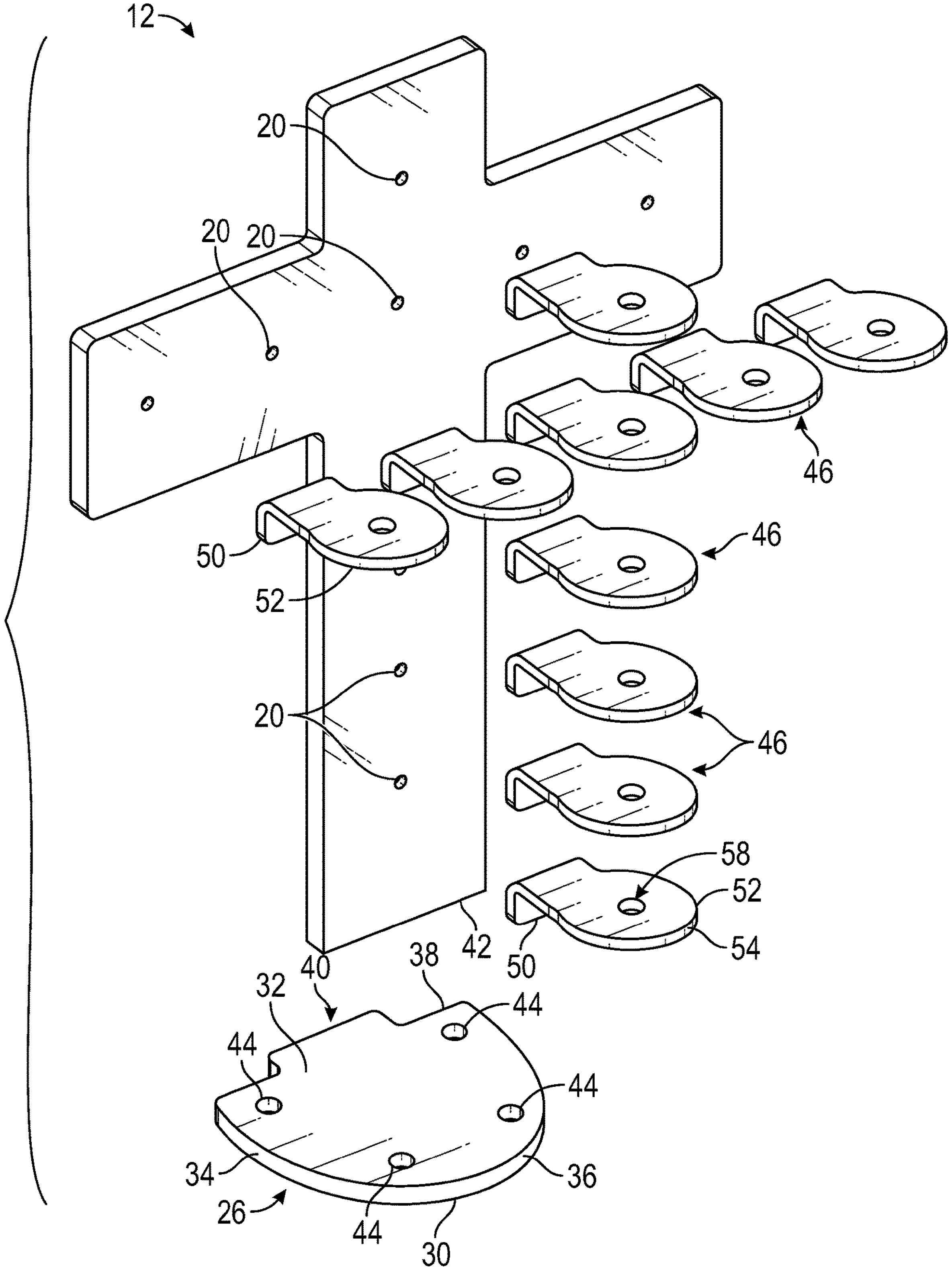
FIG. 6 is an exploded perspective view of an embodiment of the disclosure.

With reference now to the drawings, and in particular to FIGS. 1 through 6 thereof, a new candle holder device embodying the principles and concepts of an embodiment of the disclosure and generally designated by the reference numeral 10 will be described.

As best illustrated in FIGS. 1 through 6, the candle holder assembly 10 generally comprises a support panel 12 that has a pair of arms 14 each extending in opposing directions from central member 16 such that the support panel 12 defines a cross shape. Each of the arms 14 is offset from a middle 18 of the central member 16 such that the support panel 12 defines a crucifix. In this way the support panel 12 facilitates the ornamental celebration of religious holidays. The support panel 12 has a plurality of holes 20 extending through a front side 22 and a back side 24 of the support panel 12. Furthermore, the holes 20 are spaced apart from each other and are arranged in a pre-determined pattern on the support panel 12. The support panel 12 is comprised of a translucent and rigid material such as polycarbonate or other similar material.

A base 26 is attached to the support panel 12 thereby facilitating the base 26 to support the support panel 12 in a vertical orientation with respect to a support surface 28. The base 26 has a lower side 30, an upper side 32 and a perimeter edge 34 extending between the upper side 32 and the lower side 30 and the perimeter edge 34 has a forward side 36 curving away from a rear side 38 such that the base 26 has a semi-ovoid shape. The perimeter edge 34 has a prominence 40 extending away from the rear side 38 and the prominence 40 is centrally positioned along a length of the rear side 38. A lower end 42 of the central member 16 of the support panel 12 is attached to the upper side 32 of the base 26 and the central member 16 is centrally located on the upper side 32. The central member 16 is oriented such that the lower end 42 extends along a line that is oriented parallel with the rear side 38. The base 26 has a plurality of holes 44 each extending through the upper side 32 and the lower side 30 and the holes 44 in the base 26 are spaced apart from each other and are strategically located on the base 26. Additionally, the base 26 is comprised of a translucent and rigid material such as polycarbonate or other similar material.

A plurality of holders 46 is provided and each of the holders 46 is attachable to the support panel 12 having each of the holders 46 extending away from the support panel 12. In this way each of the holders 46 can support an object 48 for the purposes of an ornamental display. Each of the holders 46 comprises a first panel 50 that is perpendicularly oriented with a second panel 52 and the second panel 52 is rounded at a distal end 54 of the second panel 52 with respect to the first panel 50. Each of the holders 46 has a first hole 56 extending through the first panel 50 and each of the holders 46 has a second hole 58 extending through the second panel 52. The second hole 58 is centrally positioned on the second panel 52 to facilitate the object 48 to be secured to the second panel 52. The first hole 56 in the first panel 50 of each of the holders 46 is aligned with a respective one of the holes 20 in the support panel 12 having the second panel 52 lying on a plane that is perpendicularly oriented with the front side 22 of the support panel 12. A plurality of fasteners 60 is provided and each of the fasteners 60 is extendable through the first hole 56 in the first panel 50 of a respective one of the holders 46 and through the respective hole 20 in the support panel 12 for attaching the holders 46 to the support panel 12. Each of the fasteners 60 may comprise a nut and a bolt or other type of releasable, mechanical fastener.

A light strip 62 is provided which includes a plurality of light emitters 64 that is positionable to extend around the support panel 12 to enhance the ornamental appeal of the support panel 12. The light strip 62 extends around a perimeter edge 66 of the support panel 12 such that the light strip 62 extends around each of the arms 14 and the central member 16. Additionally, each of the plurality of light emitters 64 is electrically coupled to each other to form an electrical circuit. Each of the light emitters 64 may comprise a light emitting diode or other type of electronic light emitter. Additionally, each of the light emitters 64 may emit light of a variety of colors. A power supply 68 is positionable on the base 26 having the power supply 68 being positioned on the prominence 40 associated with the base 26 and the power supply 68 is electrically coupled to the plurality of light emitters 64 on the light strip 62. The power supply 68 may comprise a rechargeable battery 70 or the power supply 68 may comprise a power cord 72 with a male plug 74 that can be plugged into a power source 76 comprising a female electrical outlet.

In use, the support panel 12 is positioned in a desired location and a chosen number of the holders 46 are attached to the support panel 12 at chose locations on the support panel 12. Objects 48, such as candles for example or other type of ornament, can be positioned on the holders 46 to enhance the ornamental appearance of the support panel 12. Additionally, the light strip 62 can be strung around the support panel 12 to illuminate the support panel 12. In this way the support panel 12 and the holders 46 can be employed to ornamentally celebrate religious holidays or other special occasions. Furthermore, the holders 46 can be arranged on the support panel 12 to facilitate a photo or other object to be positioned amongst the holders 46 to memorialize a deceased loved one, for example.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A candle holder assembly for holding a plurality of candles in a cruciform orientation, said assembly comprising:

a support panel having a pair of arms each extending in opposing directions from central member such that said support panel defines a cross shape, each of said arms being offset from a middle of said central member such that said support panel defines a crucifix wherein said support panel is configured to facilitate the ornamental celebration of religious holidays;

a base being attached to said support panel thereby facilitating said base to support said support panel in a vertical orientation with respect to a support surface:

a plurality of holders, each of said holders being attachable to said support panel having each of said holders extending away from said support panel thereby facilitating each of said holders to support an object for the purposes of an ornamental display:

a light strip including a plurality of light emitters being positionable to extend around said support panel wherein said light strip is configured to enhance the ornamental appeal of said support panel;

wherein said support panel has a plurality of holes extending through a front side and a back side of said support panel, said plurality of holes being spaced apart from each other and being arranged in a pre-determined pattern on said support panel;

wherein said base has a lower side, an upper side and a perimeter edge extending between said upper side and said lower side, said perimeter edge having a forward side curving away from a rear side such that said base has a semi-ovoid shape, said perimeter edge having a prominence extending away from said rear side, said prominence being centrally positioned along a length of said rear side;

wherein a lower end of said central member of said support panel being attached to said upper side of said base, said central member being centrally located on said upper side, said central member being oriented such that said lower end extends along a line being oriented parallel with said rear side; and wherein said base has a plurality of holes each extending through said upper side and said lower side, said holes in said base being spaced apart from each other and being strategically located on said base.

2. The assembly according to claim 1, wherein each of said holders comprises a first panel being perpendicularly oriented with a second panel, said second panel being rounded at a distal end of said second panel with respect to said first panel, each of said holders having a first hole extending through said first panel, each of said holders having a second hole extending through said second panel, said first hole in said first panel of each of said holders being aligned with a respective one of said holes in said support panel having said second panel lying on a plane being perpendicularly oriented with said front side of said support panel.

3. The assembly according to claim 2, further comprising a plurality of fasteners, each of said fasteners being extendable through said first hole in said first panel of a respective one of said holders and through said respective hole in said support panel for attaching said holders to said support panel.

4. The assembly according to claim 1, wherein said light strip extends around a perimeter edge of said support panel such that said light strip extends around each of said arms and said central member, each of said plurality of light emitters being electrically coupled to each other to form an electrical circuit.

5. The assembly according to claim 1, further comprising a power supply being positionable on said base having said power supply being positioned on said prominence associated with said base, said power supply being electrically coupled to said plurality of light emitters on said light strip.

6. A candle holder assembly for holding a plurality of candles in a cruciform orientation, said assembly comprising:

a support panel having a pair of arms each extending in opposing directions from central member such that said support panel defines a cross shape, each of said arms being offset from a middle of said central member such that said support panel defines a crucifix wherein said support panel is configured to facilitate the ornamental celebration of religious holidays, said support panel having a plurality of holes extending through a front side and a back side of said support panel, said plurality of holes being spaced apart from each other and being arranged in a pre-determined pattern on said support panel;

a base being attached to said support panel thereby facilitating said base to support said support panel in a vertical orientation with respect to a support surface, said base having a lower side, an upper side and a perimeter edge extending between said upper side and said lower side, said perimeter edge having a forward side curving away from a rear side such that said base has a semi-ovoid shape, said perimeter edge having a prominence extending away from said rear side, said prominence being centrally positioned along a length of said rear side, a lower end of said central member of said support panel being attached to said upper side of said base, said central member being centrally located on said upper side, said central member being oriented such that said lower end extends along a line being oriented parallel with said rear side, said base having a plurality of holes each extending through said upper side and said lower side, said holes in said base being spaced apart from each other and being strategically located on said base;

a plurality of holders, each of said holders being attachable to said support panel having each of said holders extending away from said support panel thereby facilitating each of said holders to support an object for the purposes of an ornamental display, each of said holders comprising a first panel being perpendicularly oriented with a second panel, said second panel being rounded at a distal end of said second panel with respect to said first panel, each of said holders having a first hole extending through said first panel, each of said holders having a second hole extending through said second panel, said first hole in said first panel of each of said holders being aligned with a respective one of said holes in said support panel having said second panel lying on a plane being perpendicularly oriented with said front side of said support panel;

a plurality of fasteners, each of said fasteners being extendable through said first hole in said first panel of a respective one of said holders and through said respective hole in said support panel for attaching said holders to said support panel;

a light strip including a plurality of light emitters being positionable to extend around said support panel wherein said light strip is configured to enhance the ornamental appeal of said support panel, said light strip extending around a perimeter edge of said support panel such that said light strip extends around each of said arms and said central member, each of said plurality of light emitters being electrically coupled to each other to form an electrical circuit; and a power supply being positionable on said base having said power supply being positioned on said prominence associated with said base, said power supply being electrically coupled to said plurality of light emitters on said light strip.

* * * * *